United States Patent
Matsukura et al.

(10) Patent No.: US 6,335,739 B1
(45) Date of Patent: Jan. 1, 2002

(54) TERMINAL OPERATION SYSTEM

(75) Inventors: Ryuichi Matsukura; Satoru Watanabe; Kazuo Sasaki, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,004

(22) Filed: Oct. 20, 1999

(30) Foreign Application Priority Data

Dec. 15, 1998 (JP) .................................................. 10-356008

(51) Int. Cl.$^7$ ...................................................... G06F 3/00
(52) U.S. Cl. ........................ 345/755; 345/753; 709/204; 709/205
(58) Field of Search ............................ 345/619, 730–734, 345/741, 743, 751, 753–755, 759; 709/204, 205

(56) References Cited

U.S. PATENT DOCUMENTS

| | | |
|---|---|---|
| 4,897,801 A | 1/1990 | Kazama et al. |
| 5,617,539 A * | 4/1997 | Ludwig et al. ........... 395/200.02 |
| 5,907,324 A * | 5/1999 | Larson et al. ................ 345/330 |
| 2001/0004254 * | 6/2001 | Okahara et al. .............. 345/157 |

FOREIGN PATENT DOCUMENTS

EP  0 784 271  7/1997

* cited by examiner

Primary Examiner—Almis R. Jankus
Assistant Examiner—T. F. Cunningham
(74) Attorney, Agent, or Firm—Staas & Halsey LLP

(57) ABSTRACT

In electronic conference systems, a terminal operation system prevents a conflict of operations to a plurality of processing objects displayed on a shared screen of an operated terminal, enhances smooth proceeding of the conference and realizes easier operation. An operating terminal and an operated terminal are connected via a network, and an operation authority is set on a shared screen display device of the operated terminal by each AP or window as an unit for processing objects. The operation authority is managed with an operation authority managing table in an operation authority managing portion, which controls the active processing objects and operates input operation from the operating terminal having the operation authority and the processing objects via an operation input accepting portion. Conditions can be set with respect to acquiring operation authorities and making them effective. The operated terminal also plays a roll as one operating terminal by acquiring the operation authority as one operating terminal under an equal condition.

12 Claims, 11 Drawing Sheets

| window name | operation authority acquisition user ID |
|---|---|
| conference material (word processor) | suzuki |
| budget (table calculation sheet) | Sato |
| minutes (word processor) | Tanaka |

Fig. 5

TERMINAL OPERATION SYSTEM

BACKGROUND OF THE INVENTION

1. Field of the Invention

The present invention relates to a terminal operation system for operating at least one computer terminal (operated terminal) by at least one other computer terminal (operating terminal) by utilizing the corresponding input devices such as keyboards and mice connected to the operating terminals, where a plurality of operated terminals and operating terminals are connected to each other in a network.

2. Description of the Related Art

With the development of computer network systems such as local area network (hereinafter, referred to as LAN) and the internet in recent years, computers have been used in various ways. One of them is an electronic conference system in which a large display computer is used as a large-sized projector screen, or an electronic whiteboard, a plurality of operating terminals for conference participants are connected to each other via a network, and conference participants proceed the conference by showing materials on the large screen.

This electronic conference system is designed to be used by connecting a plurality of operating terminals for conference participants in a conference room where the electronic conference is held and a plurality of operating terminals for remote conference participants via the network. In this electronic conference system, electrically prepared documents (data files made with such as word processors and presentation tools) are opened from every operating terminal with an appropriate application and displayed on a projector screen. An electrically prepared documents of interest is pointed out and explained with pointing devices such as a mouse, and further edited through input devices cooperatively. The operating terminals for electronic conference participants are used as terminals for operating the electronic whiteboard via the network as well as local terminals for the individual users.

In general, a personal computer (hereinafter, referred to as PC) is designed to be operated by one person who is using it. Therefore, when a PC is used as a shared PC such as an electronic whiteboard where a plurality of users can simultaneously operate, some kind of exclusive control of the operation input to the PC is necessary in order to limit the number of persons who can actually perform the operation input to the PC. For this exclusive control, the operation authority is introduced.

In terms of the operation authority, the technology for automatically switching the assignment of the operation authority between operating terminals for conference participants is known. In this technology, when a terminal receives a request to acquire the operation authority from another terminal while operating an operated terminal after acquiring the operation authority, the operating authority is switched after asking another terminal whether the operation authority can be transferred or by determining the priority of the command sent out by the terminal requesting the operation authority.

In the above technology, only one operation authority is set, and the operation authority can be acquired by only one operating terminal. Therefore, once one operating terminal acquires the operating authority, the other terminals cannot operate the operated terminal at all.

In the electronic conference system in which one operated terminal is operated by a plurality of operating terminals, an exclusive control is necessary so that simultaneous operation input is inhibited only with respect to data input that changes or updates a data content on the operated terminal if the data is input. However, simultaneous operations cause no problem with respect to a pointing operation in which a certain area in the screen is pointed in the same manner as a mouse. On the contrary, in the electronic conference, in order to enhance mutual communication and convenience for proceeding the conference, it is preferable to provide a function that enables a plurality of conference participants to perform the pointing operation on a large-sized projector or electronic white board simultaneously.

With respect to the above problem, simultaneous pointing operations can be performed by providing several levels of operation authorities. In other words, a plurality of kinds of operation authorities that are layered according to the operation content are provided, such as a data input operation authority for a data input operation to an operated terminal, and a pointer operation authority only for pointing operations such as a mouse operation and a pointer movement. According to those kinds of operation authorities, only one operating terminal with the data input operation authority is allowed to input data to the operated terminal, and at the same time the other operating terminals are given only the pointer operation authority for the operated terminal. Thus, data inputs and pointing operations can be simultaneously realized without any confusion.

However, a method for controlling the operation authority for a screen such as a large-sized projector in conventional electronic conference systems has posed the following problems yet to be solved.

Firstly, since an operation authority is set to the operation on the entire screen provided by the operated terminal, in an environment of multiple windows, the operation authority is moved every time when applications and windows are switched, thereby causing a complexity of operations. For example, when a plurality of windows are on the screen and one window displays a main presentation document for a conference and another window displays an input screen on which to take the minutes of the proceeding of the conference, the operations by a main speaker and the operation of taking the minutes by a person in charge proceed simultaneously. In this case, the operation authority is frequently switched, thereby disturbing a smooth proceeding of the conference.

The second problem is a conflict between an operation based on operation authority set to an operating terminal and a direct operation by an operated terminal itself. In general, the operated terminal that provides a screen to be operated simultaneously by the operating terminal is also a PC, and, from the viewpoint of efficient utilization of resources, it is assumed that the operated terminal is also used by a conference participant as a operating terminal. In this case, the operation of the screen from the operated terminal is a direct operation to itself and not restricted based on the operation authority. Therefore, when a PC is used as an operated terminal and as an operating terminal, the direct operation as the operated terminal and the operation based on the operation authority as an operating terminal in the electronic conference system conflicts each other. Thus, when the operated terminal is possibly to be directly operated, prevention of the conflict with the operation authority is necessary.

The third problem is that release or transfer of an operation authority do not always proceed smoothly in an actual use. In other words, since a data input operation authority excludes other users' operation for a certain period to allow exclusive input operations, conference participants usually do not struggle for obtaining the operation authority. They do not request that the operation authority should be transferred when another participant is holding it, or rather sometimes tend to hesitate to acquire it. In a situation where one operating terminal is currently holding the operation authority, and after a series of input operations, speech or oral explanation is continued while the operation authority remains in the operating terminal that is not used, there is a problem in that the other conference participants find it hard to acquire the operation authority. Also, in a situation where there are a plurality of screens and operated terminals, an operation authority is set to each screen and a main speaker as the master of the ceremony uses a plurality of screens (for example, one display showing document 1 and another display showing document 2), even when the speaker is involved in operating only one of the screens for a certain period, the operation authorities for both of the screens often are held by the speaker without being released.

SUMMARY OF THE INVENTION

With regard to the above-described problems, in an environment of multiple windows, it is an object of the present invention to provide a terminal operation system that allows edition by simultaneous operations of individual applications on individual windows on a shared screen and that can avoid the conflict of operation input that might occur in each window. Hereinafter, the shared screen means the screen such as a large-sized display provided by the operated terminal and the screen is operated commonly by at least one operating terminal simultaneously. When there are plural operating terminals that have operating authority for the applications on the shared screen, the screen can be operated commonly by the plural operating terminals simultaneously.

Furthermore, it is an object of the present invention to provide a terminal operation system that can avoid the conflict between a direct operation to a window on a shared screen from an operated terminal and an operation based on the operation authority in an electronic conference system.

It is a still further object of the present invention to provide a terminal operation system that can prevent the operation authority from holding without being used and that can perform smooth release and transfer of the operation authority in an actual use.

To solve the above problems, a terminal operation system according to the present invention, uses an input/output device connected to a first computer terminal to operate a second computer terminal in a communication channel where a plurality of computer terminals are connected to each other. The second computer terminal includes a display portion, a display controlling portion for controlling and displaying a plurality of processing objects on the display portion, and an operation authority managing portion for managing and controlling setting and assignment of an operation authority individually to each of the plurality of processing objects. The first computer terminal acquires the operation authority for each of the processing objects that the first computer terminal desires to operate from the operation authority managing portion so as to perform operation input to the processing object based on the acquired operation authority.

With this embodiment, the operation authority can be set to each of the processing objects precisely, improving the convenience for the electronic conference participants, leading to a smooth proceeding of the conference. For example, when there are a conference material and the minutes of the conference as processing objects, a main speaker can hold the operation authority for the material and a secretary can hold the operation authority for the minutes. Also, when electronic conference participants bring their own materials together and have them displayed on the shared screen, each of the electronic conference participants can hold the operation authority for his own material.

It is preferable that the second computer terminal includes an operation object managing portion for specifying one processing object that is currently operable for processing among the plurality of processing objects displayed on the display portion, and an operation input accepting portion for accepting operation input to the processing object specified by the operation object managing portion. The operation authority managing portion treats only the operation authority set to the processing object specified in the operation object managing portion as effective, the operation input accepting portion accepts only the operation input from the first computer terminal holding the operation authority. When the processing object specified by the operation object managing portion is changed, the operation authority managing portion treats only the operation authority set to the changed processing object as effective, and the operation input accepting portion accepts only the operation input from the first computer terminal that newly has acquired the operation authority.

With this embodiment, when there are a plurality of processing objects, one processing object can be specified and made active. Then, the operation input via the network is supplied to the above active processing object, causing no confusion. When the processing object to become active is changed, the processing object to be specified by the operation object managing portion is changed. Then, the new processing object becomes active, and the processing object that had been active returns to a usual state, thereby switching the state smoothly.

Furthermore, the terminal operation system of the present invention can be configured by the computer based platform by installing the processing program that can provide processing steps for realizing the above-mentioned terminal operation system. With this embodiment, by having the computer read the present recording medium and executing the processing steps, using the computer, the terminal operation system in which the operation authority can be set precisely to each of the processing object can be realized.

BRIEF DESCRIPTION OF THE DRAWINGS

FIG. 5 is an example of an operation authority managing table 21 managed by an operation authority managing portion 20 in accordance with the first embodiment of the present invention.

DESCRIPTION OF THE PREFERRED EMBODIMENTS

The following is a description of a terminal operation system according to the preferred embodiments of the present invention, with reference to the accompanying drawings.

FIRST EMBODIMENT

In the terminal operation system according to the first embodiment, an operation authority is set individually to each of the processing objects that is desired to be operated by using an operating terminal and an electronic conference participant with the operation authority for an active processing object operate the processing object based on the acquired operation authority.

The following is a description of the outline of the entire configuration of a terminal operation system and the outline of the entire process flow of the present system of the first embodiment, with reference to the accompanying drawings.

Figure 1:
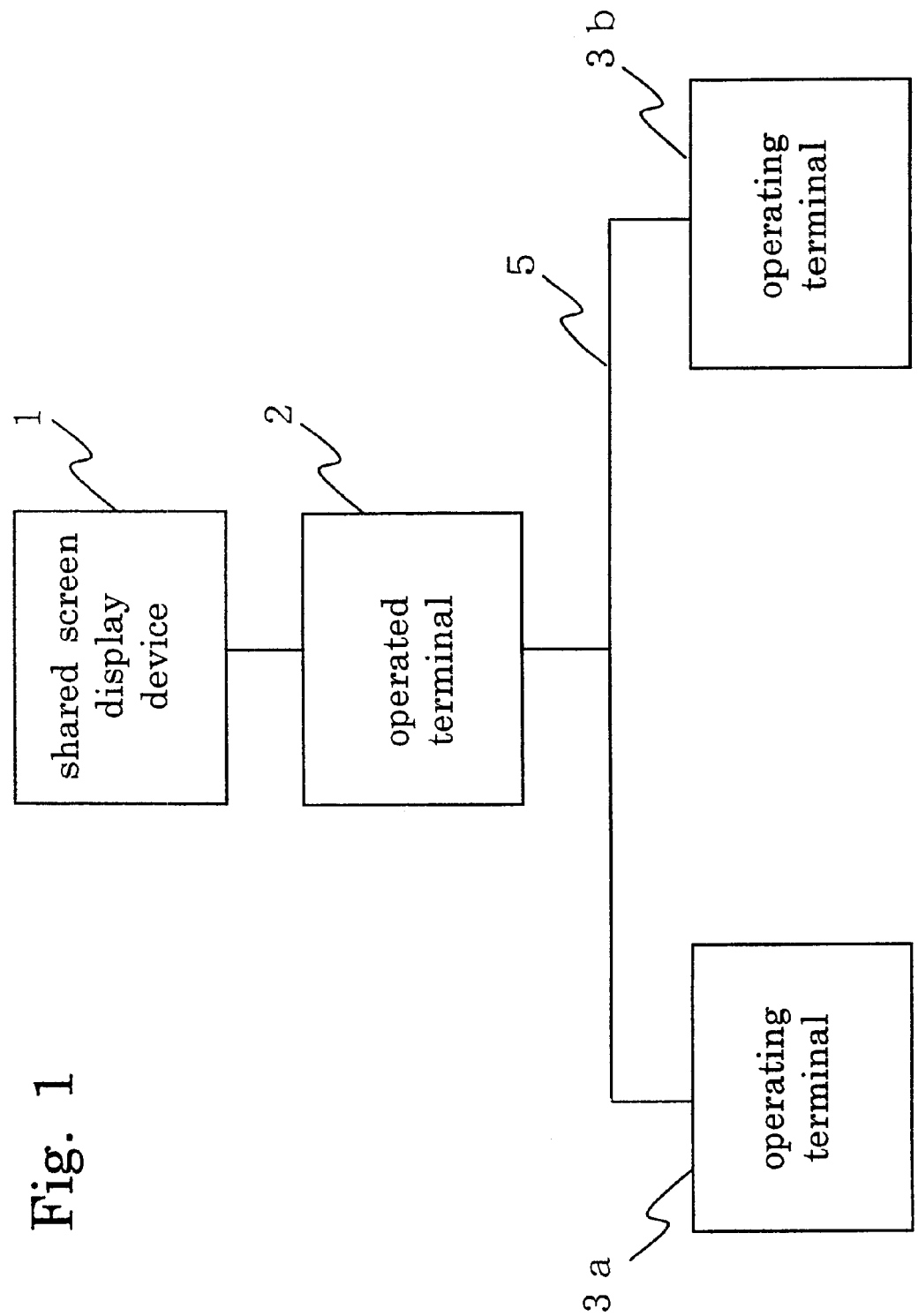
FIG. 1 is a diagram showing an outline of an entire configuration of a network realizing a terminal operation system in accordance with a first embodiment of the present invention.

FIG. 1 illustrates the outline of the configuration of an entire network realizing the terminal operation system.

In FIG. 1, numeral 1 denotes a shared screen display device such as a large-sized projector as a display portion displaying a shared screen, numeral 2 denotes an operated terminal as a terminal for directly controlling the shared screen display device 1, and numerals 3a and 3b denote operating terminals, each of which is used by each electronic conference participant. There can be a single operating terminal or plural operating terminals. The operating terminal 3, which is the first computer terminal, can be a usual personal computer provided with communication functions. The operated terminal 2 and the operating terminal 3 are connected to each other via a network 5. The operating terminal 3 can individually acquire an operation authority for a processing object on the operated terminal 2 on the shared screen in the method described later and control the processing object from a pointer input device that is an accessory thereof. Two operating terminals 3a and 3b are illustrated in FIG. 1, but the number of the operating terminals may be increased or reduced according to that of conference participants.

Figure 2:
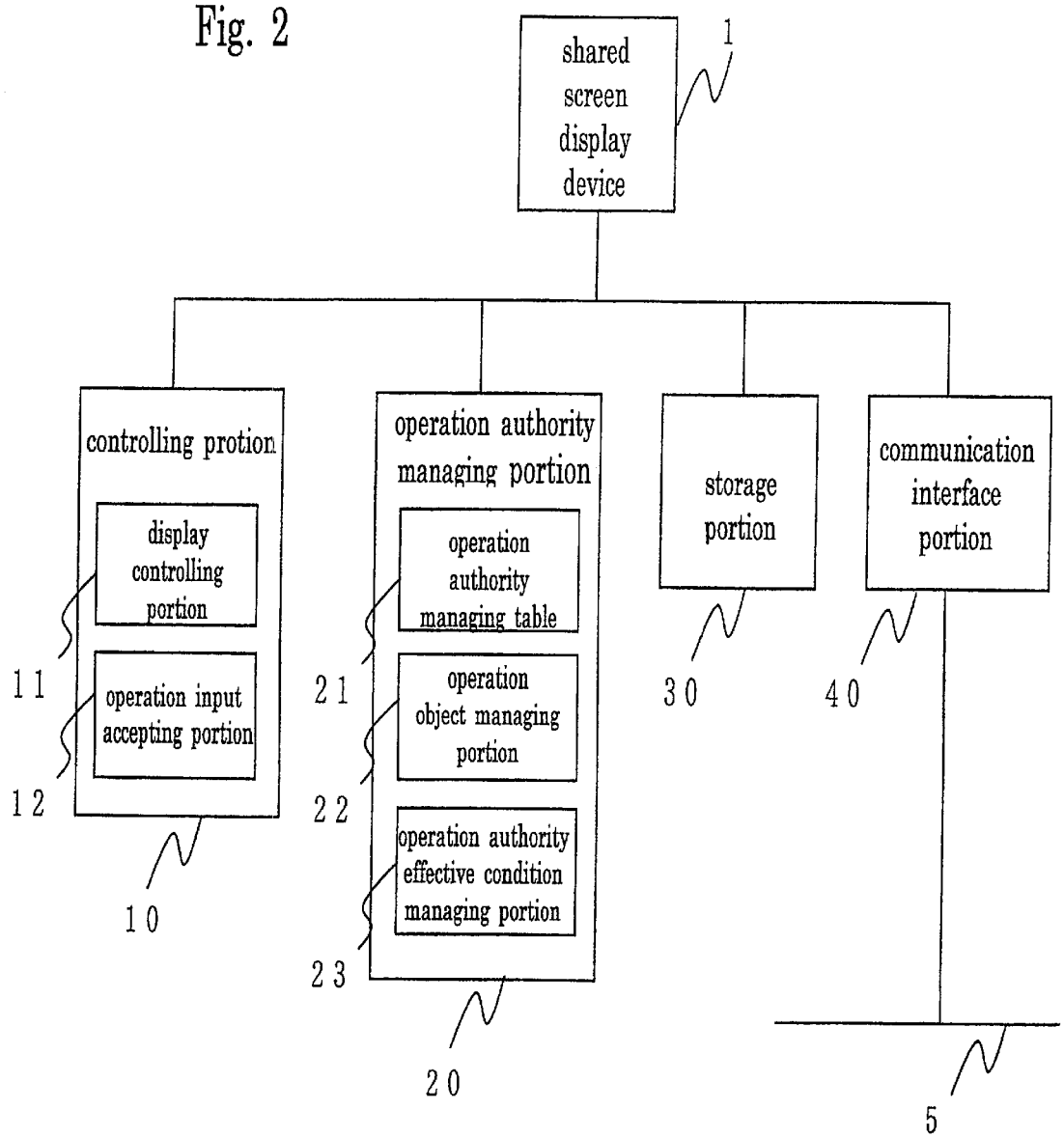
FIG. 2 is a block diagram showing an outline of the configuration of an operated terminal 2 in accordance with the first embodiment of the present invention.

FIG. 2 illustrates a block diagram showing the outline of the configuration of the operated terminal 2, which is the second information processing device of the present invention.

As is shown in FIG. 2, the operated terminal 2 of the first embodiment includes a shared screen display device 1, a controlling portion 10, an operation authority managing portion 20, a storage portion 30 and a communication interface portion 40. Although not shown in the drawings, the necessary devices for control the processing of the entire system are provided.

The shared screen display device 1 is a displaying device for computers and can be a color cathode ray tube device, a liquid crystal display device, a plasma display device, a projector, an electronic whiteboard or the like. In the first embodiment, a large-sized projector is used.

The controlling portion 10 controls the operated terminal, such as a microprocessor unit. A display controlling portion 11 controls the displaying of a plurality of processing objects on the shared screen display portion 1. It also can control a window display of various applications. An operation input accepting portion 12 accepts an operation input to a processing object specified by an operation object managing portion 22. The operation input can be a data input via keyboard, point information via a pointing device or the like.

The operation authority managing portion 20 manages and controls setting and assigning an operation authority individually to each setting and management unit of the operation authority. The operation authority managing portion 20 includes an operation authority managing table 21 that manages the operation authority of each object that is subjected to the management (hereinafter, referred to as management object) and an operation authority effective condition managing portion 23 that sets and manages a condition for switching the effectiveness/ineffectiveness of the operation authority set to each operation authority management object. The operation object managing portion 22 specifies one active processing object that can be processed at present among a plurality of processing objects displayed on the shared screen display device 1.

The storage portion 30 is a storage medium such as a memory and a hard disk, and can be either volatile or nonvolatile. The storage portion 30 stores programs and data necessary for controlling the devices, and is accessed by the controlling portion 10.

The communication interface portion 40 controls data communication between the terminal devices constructing the terminal operation system and is provided with necessary hardware and driver software.

Figure 3:
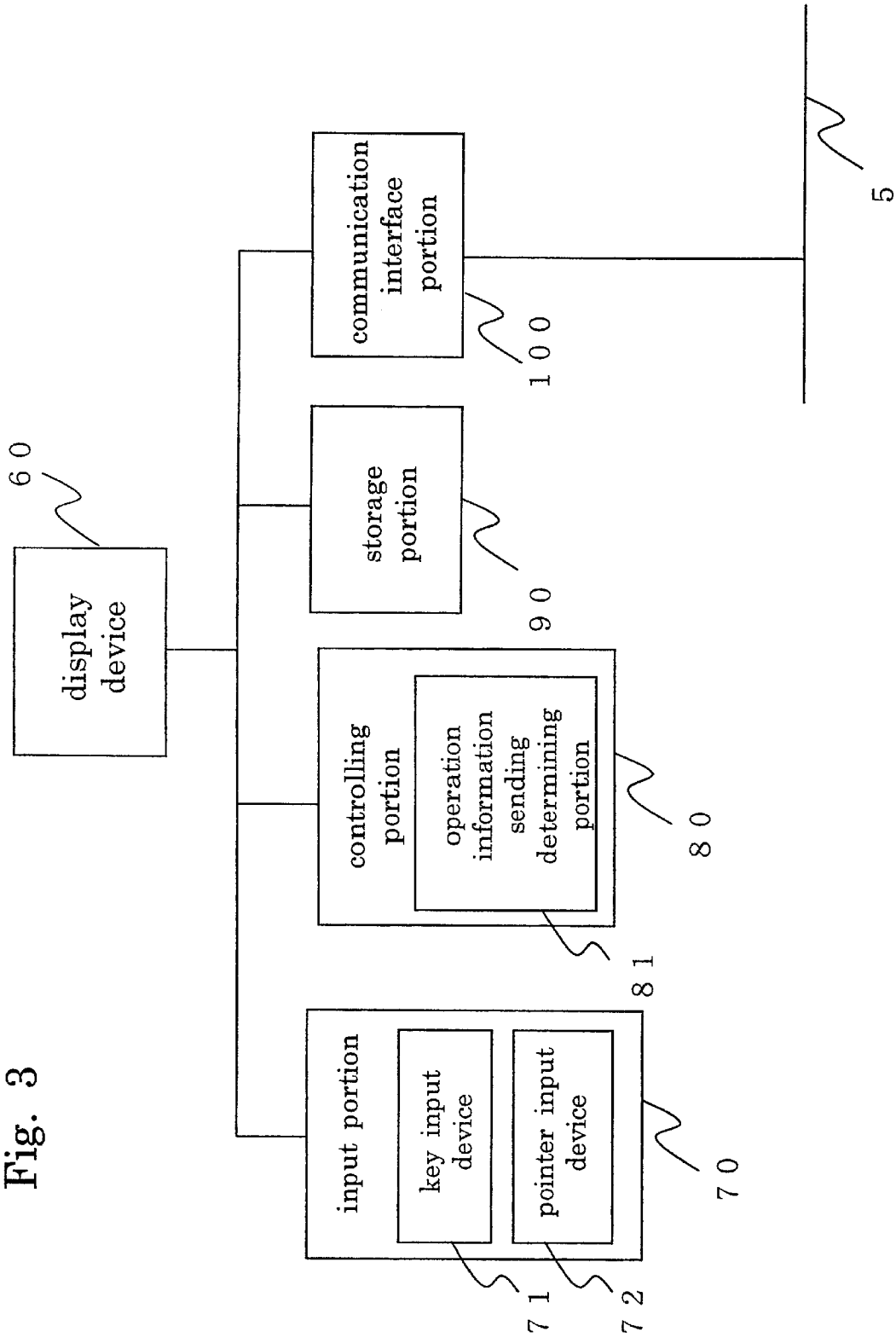
FIGS. 3 is a block diagram showing an outline of the configuration of an operating terminal 3 in accordance with the first embodiment of the present invention.

FIGS. 3 illustrates a block diagram showing the outline of the configuration of the operating terminal 3, which is the first information processing device of the present invention.

As is shown in FIG. 3, the operating terminal 3 of the first embodiment includes a display device 60, an input portion 70, a controlling portion 80, a storage portion 90 and a communication interface portion 100. Although not shown in the drawings, the necessary devices for controlling the processing of the entire system are provided.

The display device 60 is a displaying device for local screens of operating terminal users. It can be a color cathode ray tube device, a liquid crystal display device, a plasma display device as long as it is used for computers.

The input portion 70 is used by the operating terminal users who are conference participants to input operation information and includes a key input device 71 such as a keyboard and a pointer input device 72 such as a mouse. It also can include a device that can perform an input operation such as a microphone device with speech operation input processing.

Numeral 80 denotes the controlling portion such as a microprocessor unit and controls the operating terminal 3. It also includes a determining portion 81 for determining whether operation information from the input portion 70 should be sent to the operated terminal 2 or dealt with as local operation information of the operating terminal itself.

Numeral 90 denotes the storage portion including a storage device such as a memory and a hard disk.

Numeral 100 denotes the communication interface portion for controlling data communication with the operated terminal 2.

Numeral 5 denotes a network.

Figure 4:
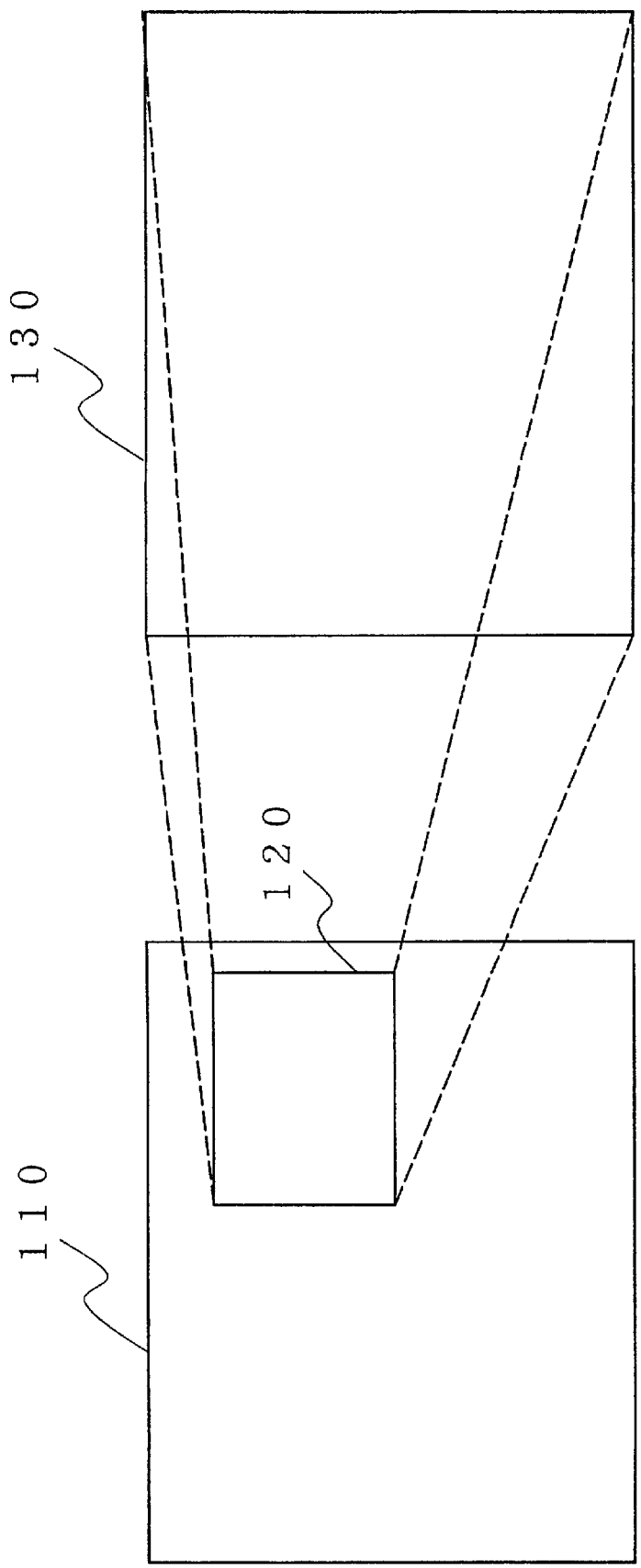
FIGS. 4 is a diagram showing an example of a display screen of the operating terminal 3 in accordance with the first embodiment of the present invention.

The configuration of the operating terminal 3 is the same as that of the operated terminal except the controlling portion 80, and the portions that already have been explained in the description of the operated terminal are the same. Hereinafter, the controlling portion 80 will be described. The operation information sending determining portion 81 provided in the controlling portion 80 determines whether input information obtained by a conference participant operating a keyboard 71 or a mouse 72 in the operating terminal 3 should be sent to the operated terminal 2 or dealt with as local operation information for operating the operating terminal itself. For example, the determination can be made in the following manner. An operation window 120 for operating the operated terminal 2 is displayed on a screen 110 of the operating terminal 3 as is shown in FIG. 4. The data is sent to the operated terminal 2 when a mouse pointer is in the operation window 120, and the data is dealt with as local operation information for operating the operating terminal itself when the mouse pointer is outside the operation window 120. The operation window 120 is displayed as a part of the screen 110 of the operating terminal 3. If the operation window 120 corresponds to a shared screen window 130, the entire shared screen window 130 can be operated with a mouse pointer.

Next, an operation authority of a terminal operation system according to the present invention is explained in detail in the following. First is an explanation of a managing unit of the setting and assignment of the operation authority. Next is an explanation of a method for managing the operation authority by an operation authority managing table 21, followed by an explanation of a method for specifying the operation authority that becomes active at the time of the operation input.

The following is a description of a unit for managing the setting and assignment of the operation authority. The operation authority is set to each operation authority management object and assigned in response to a request from each operating terminal. The unit for managing the setting and assignment of the operation authority can be, for example, a window of an application, each of shared screen display device 1 when a plurality of shared screen display are provided under multiple display configurations, or each of the screen region into which the display screen of one shared screen display device 1 is divided.

When the unit is a window of an application, the operation authority can be set to each window opened on a shared screen. Also, in an environment of multiple windows commonly utilized for a practical use, the operation authority can be set and managed precisely for each started application and used file. In other words, when there are windows for a main material and for minutes of the conference, a main speaker can hold the operation authority for the former and a secretary can hold the operation authority for the latter, thereby enhancing the smooth proceeding of the electronic conference. In this case, a background screen of a desktop can be used as one window. In other words, the operation authority of the operation input to the background screen of the desktop can be set.

When the unit is each of a plurality of shared screen display devices 1 as a multiple display, the operation authority can be set to each display device in an environment of multiple displays provided with a plurality of screen display devices. Also, the operation authority can be set and managed precisely for each display screen. For example, it is effective when a main material is displayed large on a main large screen display and a main speaker holds the operation authority for the main large screen, and the minutes of the conference are displayed on a small-sized sub-display and a secretary holds the operation authority for the sub-display.

When the unit is each of the screen regions into which the display screen of one shared screen display device 1 is divided, the operation authority can be set to each display screen region of the screen display device so that the setting and the management of the authority can be precise. For example, it is effective when a main material is displayed in the center region of a screen and a main speaker holds the operation authority for the main material, and the minutes are displayed in the bottom-right region of the screen and a secretary holds the operation authority for the minutes of the conference. This setting may be effective also in the following situation. When a group of people are sharing work for cooperative revision or edition of data displayed on one application window, such as large scale design drawing, in the form of meeting, each person is assigned a portion by the screen region unit and the person in charge holds its operation authority.

Next, the following is an explanation of the operation authority managing table 21. FIG. 5 is an example of the operation authority managing table 21 managed by the operation authority managing portion 20. This is an example of setting, assigning and managing an operation authority individually to each application window. The operation authority is set to each of the windows for displaying conference materials as the main materials, displaying table calculation sheets regarding a budget for a project, and displaying the minutes of the conference. The operation authority managing table 21 manages the operation authority by linking the windows to the user IDs of the operating terminals holding the operation authorities.

The number of operation authorities that can be simultaneously held by one operating terminal may be unlimited, but preferably be set to one. This prevents one operator from unnecessarily occupying operation authorities of a plurality of windows, since one operator generally can operate only one window at one time. In this case, when an operation object is shifted from one window to another window, the operation authority of the former window is automatically released, and the entry is automatically removed from the user ID shown in FIG. 5.

Moreover, when the conflict of acquisition of an operation authority occurs, the priority that the operation authority is preferentially assigned to an operating terminal user who starts the application window may be given. In this case, the operation authority managing table 21 shown in FIG. 5 has an application window starting user ID as an entry item.

When forming the operation authority managing table 21, entries may be initially provided by the unit for setting the operation authority, or may be dynamically formed. For example, in FIG. 5, every time an application is started to open a window, the window is entried in the operation authority managing table 21 as an operation authority management unit. Then, when the operation authority of the window is acquired by a operating terminal, the user ID of the operating terminal is dynamically registered in the operation authority acquisition user ID. Similarly, the operation authority is dynamically released and updated. The operation authority is released, the corresponding user ID is removed, and a new user ID of the user who newly has acquired the operation authority, if any, is registered.

Furthermore, an operation authority which has been set can also be removed dynamically, and preferably be removed automatically. When changing an operation processing object, operation authorities other than that of the operation processing object are dynamically released. For example, when an operation object is changed from a window of a conference material to that of a table calculation sheet of a budget for a project, the corresponding user ID is automatically forced to be removed from the user ID entry of the operation authority for the window of the conference material. This process prevents unnecessary operation authority from remaining. Also, an operator does not have to go through the procedure for releasing the operation authority, thus improving convenience.

Next, the following is a description of methods for specifying an operation authority that becomes active at the time of an operation input, switching and updating the same. The operation authority effective condition managing portion 23 that sets and manages a condition for switching the effectiveness/ineffectiveness of the operation authority set to each processing object manages the operation authority that becomes active.

The operation authority effective condition managing portion 23 specifies one operation authority as an active state based on the operation authority managing table 21. For example, an effective condition held by the operation authority effective condition managing portion 23 is that an pointer is in an application window. This pointer can be defined as a main pointer or an operating pointer in a sense that this is a pointer that allows an operation input based on the operation authority. In another environment in which an indicating pointer that can only indicate on a shared screen is provided in each operating terminal, the effective condition can be that the operating pointer is in the window. In the example of FIG. 5, it is preferable that the operation authority set to an application window in which there is a pointer of an operated terminal 2 as the second computer terminal is effective. After the pointer moves to another application window, it is preferable that the operation authority set to the window to which the pointer moves becomes effective. In other words, when the pointer is displayed in the window of conference materials, the operation authority for the window of conference materials held by the operating terminal of the user ID "Suzuki" is automatically selected as the active operation authority. This design makes it possible to match the window where a pointer is with the window that is active in the operation input automatically, leading to a smooth operation. When the pointer moves to the window of the table calculation sheet of a budget for a project, the operation authority that is active in the operation input is automatically switched, and the operation authority of the window of the table calculation sheet of a budget for the project held by the operating terminal of the user ID "Sato" becomes active instead.

In the above example, the condition under which the operation authority effective condition managing portion 23 manages is that the pointer of the second computer terminal 2 is in a window, but other conditions are also possible. For example, a specific gesture of a pointer, for example, clicking a specific region such as an arbitrary region in the window and "an operation authority acquiring button" with the pointer can be used as the condition. Alternatively, the condition can be defined based on the period of time during which the pointer remains in the window after the pointer moves.

In the above example, only one window becomes active at one time, and the operation input cannot be performed in other windows. However, it is possible that a plurality of windows become active at one time and the operation authorities corresponding thereto become effective. In this case, a data stream of operation input information sent on a network includes header information that indicates the user ID and the operation authority by each sent unit. Then, the operated terminal 2 as the second computer terminal analyzes the header and distributes the operation input information to corresponding operation objects.

In this manner, specifying an operation authority to be activated leads to a smooth operation input from an operating terminal via the network.

Figure 6:
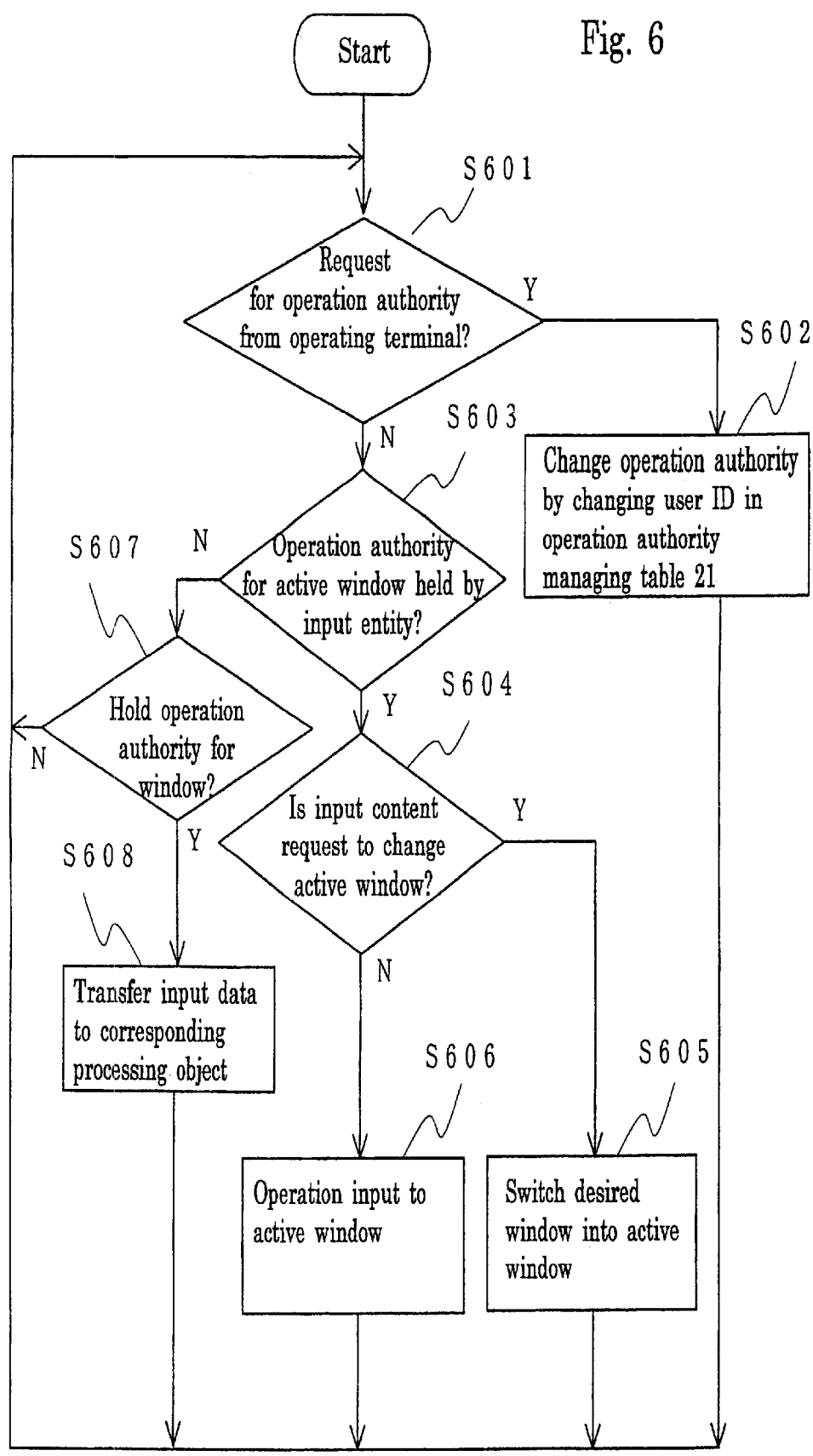
FIG. 6 is a flowchart showing an outline of the process flow of the terminal operation system of the first embodiment of the present invention.

Next, the outline of the process flow of the terminal operation system of the first embodiment is explained, with reference to the flowchart shown in FIG. 6. It is presupposed that a shared screen is displayed and a plurality of application windows are formed.

First, data is input from an operating terminal on the network. The operation input accepting portion 12 accepts the data and transfers it to the controlling portion 10. The controlling portion 10 checks whether the input content is a request to acquire an operation authority (step S601).

If it is a request to acquire an operation authority (step S601: Y), the operation authority managing portion 20 checks the condition and the priority with respect to the acquisition of the operation authority. If the requirements are met, the operation authority is changed by changing the user ID in the operation authority managing table 21 (step S602).

If it is not a request to acquire an operation authority (step S601: N), the operation authority managing portion 20 checks whether the input entity holds the operation authority for the active window (step S603).

If the input entity holds the operation authority for the active window (step S603: Y), the operation authority managing portion 20 transfers the data to the controlling portion 10. The controlling portion 10 checks whether the input content is a request to change the active window (step S604).

If the input content is a request to change the active window (step S604: Y), the active window is switched so that a desired window becomes active (step S605).

If the input content is not a request to change the active window (step S604: N), the controlling portion 10 determines that the input content is input operation information to the active window, and transfers the data to the processing object as key input information and pointing information (step S606).

If the input entity does not hold the operation authority for the active window (step S603: N), the operation authority managing portion 20 checks whether the operating terminal of the data input entity holds the operation authority for the window where the pointer of the operating terminal (indicating pointer) resides (step S607).

If the input entity holds the operation authority for the window where the pointer of the operating terminal (indicating pointer) locates (step S607: Y), the controlling portion 10 transfers the input data to the corresponding processing object (step S608). In this case, the data transferred in this step S608 can be limited to pointing operation information, and key input information can be dealt with as ineffective for the reason that the key input information is not involved in the active window.

As is explained above, with the terminal operation system according to the first embodiment, an operation authority is set individually to each of the processing objects that is desired to be operated by using operating terminal, and the electronic conference participant with the operation authority for an active processing object can perform an operation input to the processing object based on the acquired operation authority.

SECOND EMBODIMENT

In the second embodiment, an operated terminal providing a shared screen also plays the role of an operating terminal. The following is an explanation of a terminal operation system in which a direct operation to the shared screen by a conference participant using the operated terminal as the operating terminal can be controlled as an operation input based on the operation authority. In the following, when the operated terminal itself acts as an operating terminal for operating its local display, this terminal is called "operating terminal for local display" for convenience.

Figure 7:
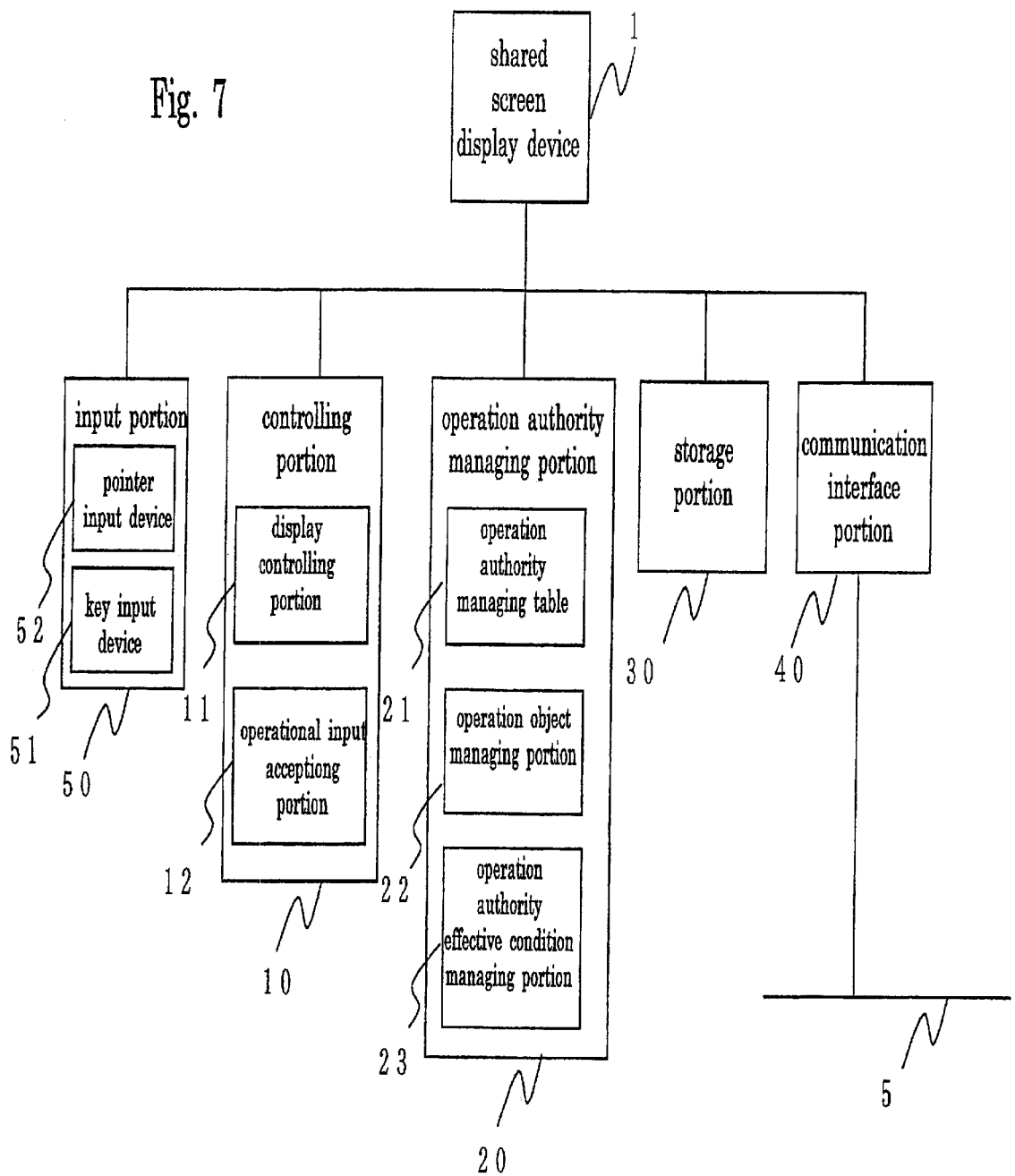
FIG. 7 is a block diagram showing an outline of the configuration of an operated terminal 2 in accordance with a second embodiment of the present invention.

FIG. 7 illustrates a block diagram showing the outline of the device configuration of the operated terminal providing the shared screen. In FIG. 7, an input portion 50 is added to the operated terminal shown in FIG. 2 of the first embodiment. The input portion 50 is a portion where users input operation information, and is provided with the key input device 51 such as a keyboard and the pointer input device 52 such as a mouse. The key input device 51 is not limited to a keyboard, but may be a key code input device such as a hand writing character recognizing device. Also, the pointer input device 52 is not limited to a mouse, but may be other pointing devices such as a tablet board and an electronic pen style pointing device. The input portion is used for input operations by a conference participant who uses this operated terminal as an operating terminal for local display. The other elements of the block diagram shown in FIG. 7 are similar to those with the same numbers in FIG. 2. Therefore, an explanation here is omitted.

The operation authority managing table 21 managed by the operation authority managing portion 20 may be the same as that shown in FIG. 5. However, since the operated terminal itself also acts as an operating terminal for local display in the present embodiment, the operated terminal has a user ID as a operating terminal, and the user ID is entered as an entry to the operation authority managing table 21 shown in FIG. 5, so that the operated terminal can acquire and hold an operation authority on equal terms with other operating terminals.

In this case, a request to acquire an operation authority is generated from the operated terminal itself and the other operating terminals. Therefore, with respect to information input from the input portion 50 of the operated terminal as well, after it is verified that the operated terminal holds the operation authority, the information is transferred to the operated terminal.

Figure 8:
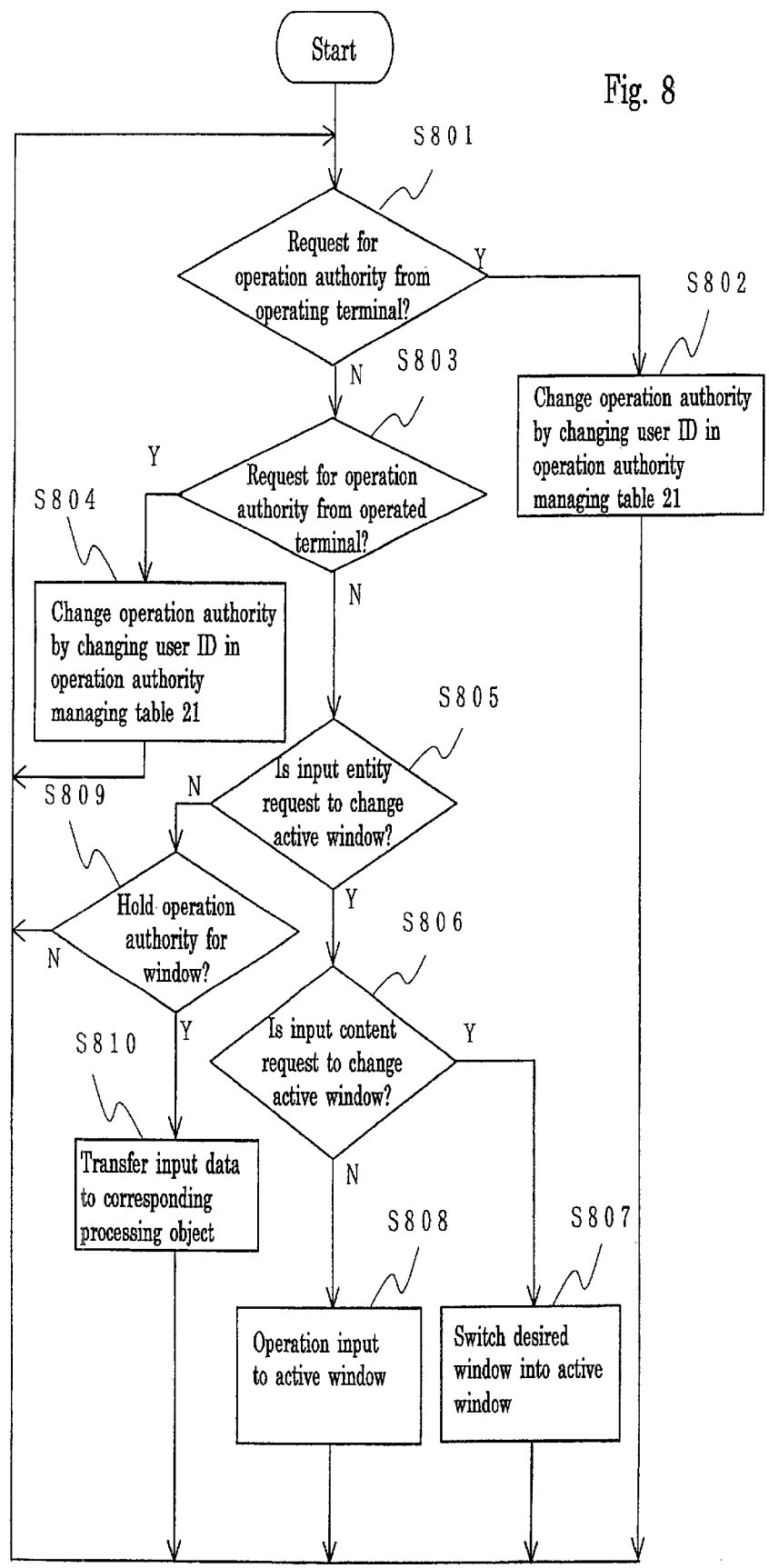
FIG. 8 is a flowchart showing an outline of the process flow of a terminal operation system of the second embodiment of the present invention.

Next, the outline of the process flow of the terminal operation system of the second embodiment is explained, with reference to the flowchart shown in FIG. 8. It is presupposed that a shared screen is displayed and a plurality of application windows are formed.

First, data is input from an operating terminal on the network. The operation input accepting portion 12 accepts the data and transfers it to the controlling portion 10. The controlling portion 10 checks whether the input content is a request to acquire an operation authority from the operating terminal (step S801).

If it is a request to acquire an operation authority from the operating terminal (step S801: Y), the operation authority managing portion 20 checks the condition and the priority with respect to the acquisition of the operation authority. If the requirements are met, the operation authority is changed by changing the user ID in the operation authority managing table 21 (step S802).

If it is not a request to acquire an operation authority (step S801: N), the controlling portion 10 checks whether the input content is a request to acquire an operation authority from the operated terminal (operating terminal for local display) (step S803).

If it is a request to acquire an operation authority from the operated terminal (operating terminal for local display) (step S803: Y), the operation authority managing portion 20 checks the condition and the priority with respect to the acquisition of the operation authority. If the requirements are met, the operation authority is changed by changing the user ID in the operation authority managing table 21 (step S804).

If it is not a request to acquire an operation authority from the operated terminal (operating terminal for local display) (step S803: N), the operation authority managing portion 20 checks whether the input entity is a request to change the active window (step S805).

The processing steps following step S805, that is, steps from S805 to S810, are the same as those from S603 to S608 in the flowchart shown in FIG. 6. Therefore, an explanation thereof is omitted here.

With such configurations and processing steps described above, in the terminal operation system according to the second embodiment, an operated terminal can be used as one of the operating terminals and each electronic conference participant can equally acquire and hold an operation authority, leading to smooth proceeding of the conference.

As described, the configuration enables the users who are using the operated terminal as operating terminal for local display to acquire and hold an operation authority on equal terms with the other operating terminal users. However, it is preferable that an operation input for local display can be given priority as a direct input. For example, the direct input is given priority, when the operated terminal is provided with a touch sensor and is surrounded by participants. In this case, since one operated terminal is directly operated by all participants, no exchange of operation authority between the other operating terminals causes no confusion. In such a direct operation of the operated terminal, the procedure of acquiring an operation authority can be omitted and operability improves. Therefore, when starting a direct operation, the operation authority can be acquired automatically. Also, when a person who has a special position such as the master of the ceremony operates the operated terminal, the direct input operation can be given priority so that the person can preferentially perform an operation.

THIRD EMBODIMENT

In the third embodiment, in view of the fact that a plurality of operated terminal cannot be operated from an operating terminal at one time, information about the operating terminal having the operation authority is notified to each other between the operated terminals and managed. Thus, the operation authority remained in the operated terminal that is not operated by the operator can be automatically abandoned or removed.

Figure 9:
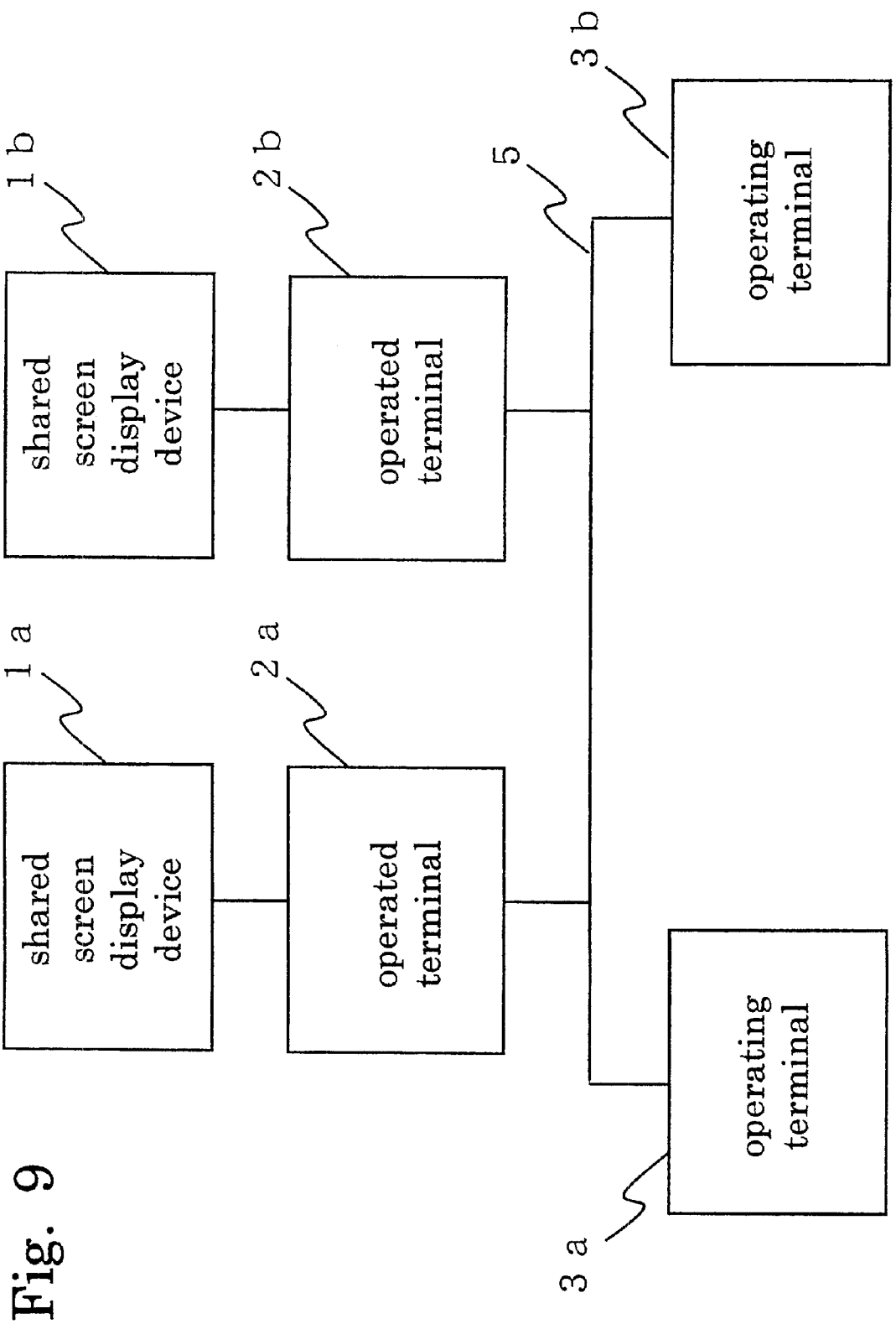
FIG. 9 is a diagram showing an outline of an entire configuration of a network realizing a terminal operation system in accordance with a third embodiment of the present invention.

A terminal operation system according to the third embodiment includes a plurality of operated terminals 2 and a plurality of operating terminals 3 as is shown in FIG. 9.

The device configurations thereof may be the same as those in the first and second embodiments. Two operated terminals 2a and 2b and two operating terminals 3a and 3b are shown in FIG. 9, but there is, of course, no particular limitation to the number of these terminals.

In the third embodiment, the operated terminal keeps the status of assigning and holding the operation authorities to the processing objects managed and displayed on the other operated terminals. This prevents one operating terminal from unnecessarily occupying the operation authorities by limiting the number of operation authorities assigned to one operating terminal on the entire network. In this case, the operation authority managing portions 20 share information or notify each other of the information on the network. One of the method is to execute necessary processing by monitoring data with respect to a request to acquire an operation authority and assignment thereof that is flowing on the network in the manner described in the following. Another method is to manage the assignment and holding of all the operation authorities by providing a region for the entry of the operation authority for the other operated terminals in the operation authority managing table 21 of the operation authority controlling portion 20 in each of the operated terminals. Either method includes notifying information on the operating terminal requesting the operation authority for the other operating terminals. The information on the request for the operation authority and the assignment thereof can be notified to all the other operated terminals at one time by sending out a broadcast message on the network.

If the number of the operation authorities that can be held by one operating terminal at one time is one, when an operating terminal newly requests that an operation authority should be acquired, the operation authority managing portions 20 in all the operated terminals monitor that information transmitted on the network and check whether the operation authority for an processing object on its own operated terminal is already given to that operating terminal. If the operation authority is already given, it is automatically released. This prevents an operation authority from being unnecessarily occupied without being used.

Figure 10:
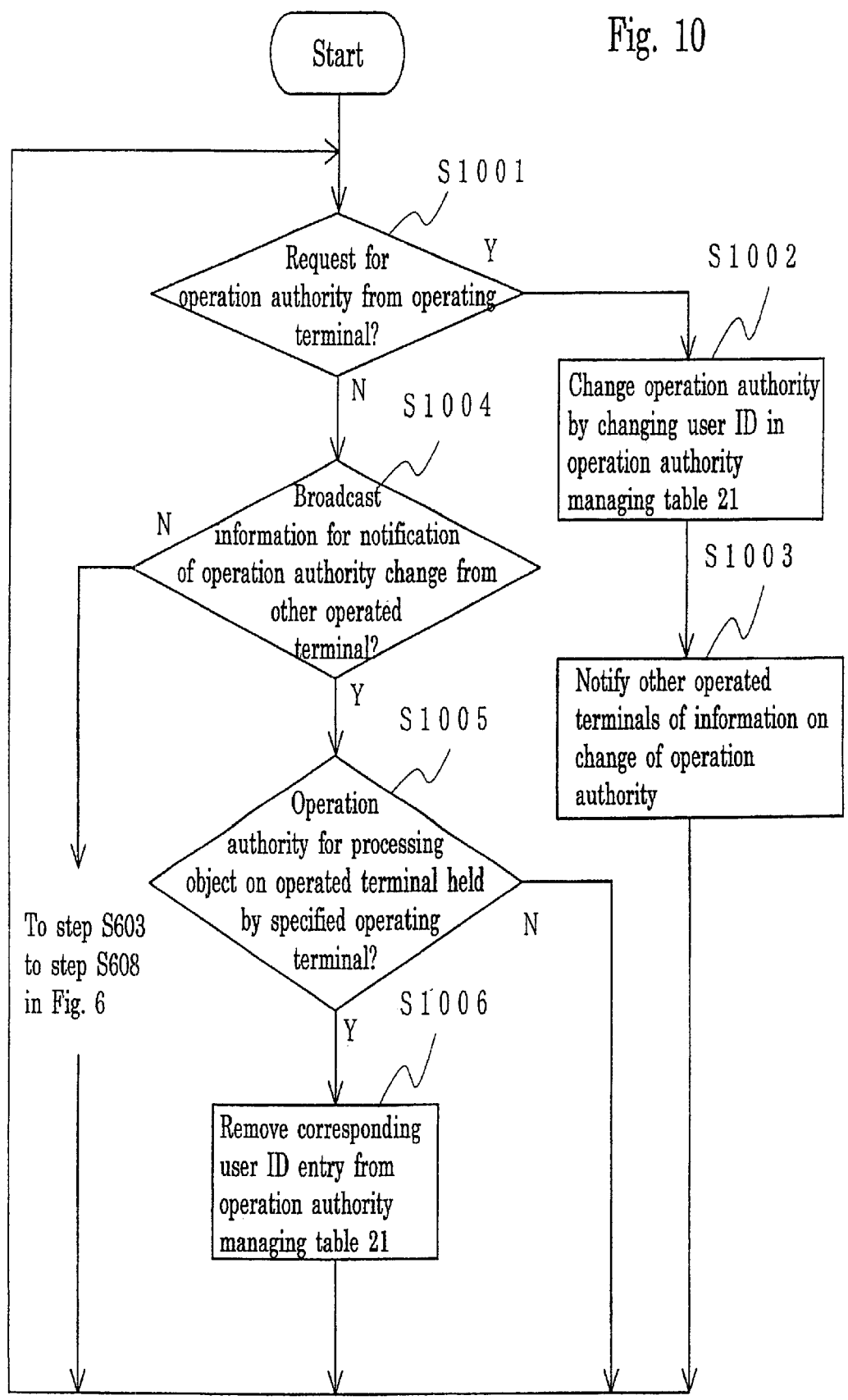
FIG. 10 is a flowchart showing an outline of the process flow of a terminal operation system of the third embodiment of the present invention.

Next, the outline of the process flow of the terminal operation system of the third embodiment is explained, with reference to the flowchart shown in FIG. 10. It is presupposed that a shared screen is displayed and a plurality of application windows are formed.

First, data is input from an operating terminal on the network. The operation input accepting portion 12 accepts the data and transfers it to the controlling portion 10. The controlling portion 10 checks whether the input content is a request to acquire an operation authority from the operating terminal (step S1001).

If it is a request to acquire an operation authority from the operating terminal (step S1001: Y), the operation authority managing portion 20 checks the condition and the priority with respect to the acquisition of an operation authority. If the requirements are met, the operation authority is changed by changing the user ID in the operation authority managing table 21 (step S 1002).

After the operation authority is changed, the controlling portion 10 notifies the other operated terminals on the network of the information on the change of the operation authority by broadcasting (step S1003). This broadcast information branches to the route Y in the step S1004 as is described below and proceeds to the following processing steps.

If the input data is not a request to acquire an operation authority from the operating terminal (step S1001: N), the controlling portion 10 checks whether it is broadcast information for a notification of an operation authority change from another operated terminal (step S1004).

If it is a notification of an operation authority change from another operated terminal (step S1004: Y), the operation authority managing portion 20 searches the operation authority managing table 21 and checks whether the operating terminal specified by the notification of operation authority change holds the operation authority for a processing object on the own terminal (step S1005).

If the result of the search shows that the operating terminal specified by the notification of operation authority change holds the operation authority for a processing object on the own terminal (step S1005: Y), the holding of the operation authority by the operating terminal is terminated and the operation authority is released. In other words, the corresponding user ID entry is removed from the operation authority managing table 21 (step S1006).

If the result of the search shows that the operating terminal specified by the notification of operation authority change does not hold the operation authority for a processing object on the own terminal (step S1005: N), the information is ignored because the information in the operation authority managing table 21 does not have to be changed. When each operation authority managing table 21 is provided with a region where the operation authority for processing objects of the other operated terminals is managed, the user ID entry is updated in accordance with the operation authority change.

If the input data is not a notification of an operation authority change from another operated terminal (step S1004: N), it is not information about the acquisition and change of the operation authority, but is usual information of a key input data and a pointing input data. Therefore, the data is input to the processing object on the shared screen via the operation input accepting portion 12 and the controlling portion 10, then the procedure goes to the processes of steps from S603 to S608 in the flowchart shown in FIG. 6. The explanation is omitted here.

With such configurations and processing steps described above, the terminal operation system according to the third embodiment can manage information on the operating terminal having an operation authority by notifying each other between the operated terminals. Then, the operation authority remained in the operated terminal that is not operated by the operator can be automatically abandoned or removed, leading to smooth proceeding of the conference.

FOURTH EMBODIMENT

Figure 11:
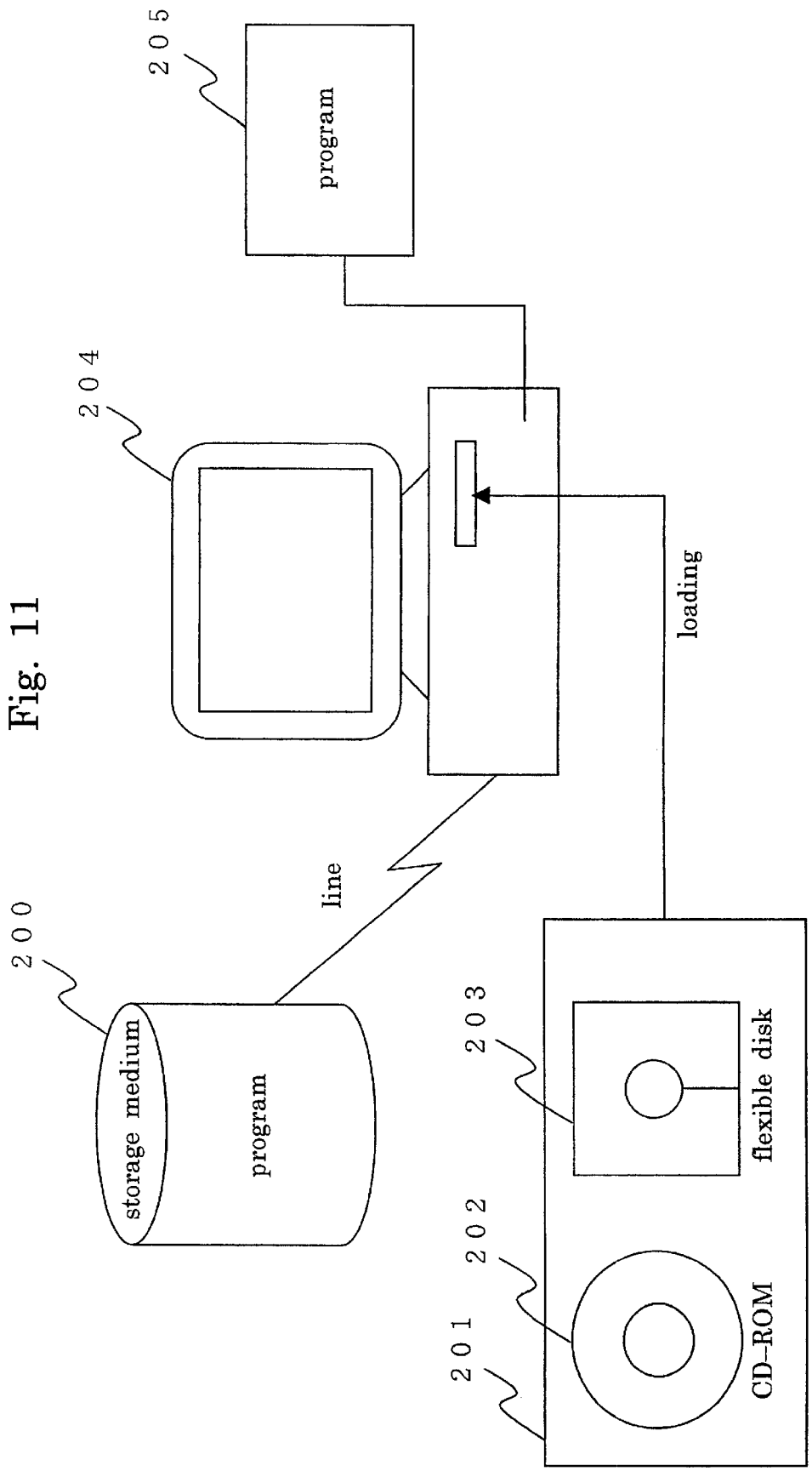
FIG. 11 is an example of a recording medium in accordance with a fourth embodiment of the present invention.

The terminal operation system according to the present invention can be configured by various computers by recording a program including the processing steps for realizing the configurations as described above on a computer-readable recording medium. As in an example shown in FIG. 11, the recording medium, on which the program provided with the processing steps realizing the terminal operation system according to the present invention is recorded, can be not only a portable recording medium 201 such as a CD-ROM 202 or a flexible disk 203, but also a recording medium 200 in a recording device on the network or a recording medium 205 such as a hard disk or a RAM in computers. When executing the program, the program is loaded into a computer 204 and executed in its main memory.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A terminal operation system for operating at least one second computer terminal by at least one first computer terminal by utilizing the corresponding input devices connected to the first terminals, where at least one first computer terminal and at least one second computer terminal are connected to each other in a communication channel, said second computer terminal comprising:
a display portion,
a display controlling portion for controlling and displaying a plurality of processing objects on said display portion, and
an operation authority managing portion for managing and controlling setting and assignment of an operation authority individually to each of the plurality of processing objects,
wherein said first computer terminal acquires the operation authority for each of the processing objects that is desired to be operated by using the first computer terminal from said operation authority managing portion so as to perform operation input to the processing object based on the acquired operation authority.

2. The terminal operation system according to claim 1, wherein said second computer terminal comprises;
an operation object managing portion for specifying one processing object that is currently operable for processing among the plurality of processing objects displayed on said display portion, and
an operation input accepting portion for accepting operation input to the processing object specified by said operation object managing portion; and
wherein said operation authority managing portion treats only the operation authority set to the processing object specified in said operation object managing portion as effective,
said operation input accepting portion accepts the operation input only from the first computer terminal holding the operation authority,
when the processing object specified by said operation object managing portion is changed, said operation authority managing portion treats only the operation authority set to the changed processing object as effective, and
said operation input accepting portion accepts only the operation input from the first computer terminal that newly has acquired the operation authority.

3. The terminal operation system according to claim 1, wherein
the processing object is managed by an application unit,
the operation authority is managed by a unit of a window region of an application displayed on a screen of said display portion, and
said operation authority managing portion dynamically sets a corresponding operation authority at every execution of starting of the application and generating a window in said first computer terminal and manages the operation authority by dynamically releasing the corresponding operation authority at every execution of ending the application and deleting the window.

4. The terminal operation system according to claim 1, wherein
said display portion includes at least one display screen,
the display screen includes at least one screen region,
the operation authority is managed by a unit of the screen region,
said operation authority managing portion treats the operation authority set to the screen region where a pointer of said second computer terminal exists as effective, and
when the pointer of said second computer terminal moves to another screen region, said operation authority managing portion treats the operation authority set to the screen region where the moved pointer exists as effective.

5. The terminal operation system according to claim 1, wherein said operation authority managing portion comprises an operation authority effective condition managing portion for setting and managing a condition for switching effectiveness/ineffectiveness of the operation authority set to each processing object and treats only the operation authority that meets the condition set to said operation authority effective condition managing portion as effective.

6. The terminal operation system according to claim 1, wherein, under a condition that only one operation authority is available to each of the first computer terminals at one time, when said first computer terminal acquires another operation authority, said operation authority managing portion releases the operation authority which has been held so far in order that another first computer terminal can acquire the released operation authority.

7. The terminal operation system according to claim 1, wherein, in an environment where said second computer terminal comprises an input portion to perform operation input to a processing object displayed on said display portion,
said second computer terminal acquires an operation authority under a same condition as said first computer terminal,
said operation authority managing portion manages acquisition of the operation authority by said second computer terminal, and
said second computer terminal performs the operation input to a corresponding processing object based on the acquired operation authority.

8. The terminal operation system according to claim 1, wherein, in an environment where said second computer terminal comprises the input portion to perform operation input to a processing object displayed on said display portion,
said second computer terminal acquires an operation authority under a different condition from said first computer terminal,
said operation authority managing portion manages acquisition of the operation authority by said second computer terminal,
said second computer terminal performs the operation input to a corresponding processing object based on the acquired operation authority,
the different condition is such that the operation authority is acquired when the operation input to the processing object is started via the input portion of said second computer terminal, and
said second computer terminal can acquire the operation authority preferentially over other first computer terminals.

9. The terminal operation system according to claim 1, wherein the terminal operation system operates at least two said second computer terminals, said operation authority managing portions comprise means for notifying each other of managing information, when one first computer terminal is permitted to acquire an operation authority, said operation authority managing portion notifies the operation authority managing portions in other second computer terminals of the acquisition, said operation authority managing portions in said other second computer terminals check whether said one first computer terminal holds the operation authority, when said one first computer terminal holds the operation authority, said operation authority managing portion releases the operation authority so that another first computer terminal can acquire the released operation authority.

10. A computer-readable recording medium storing a processing program for realizing a terminal operation system, which uses an input/output device connected to a first computer terminal to operate a second computer terminal in a communication channel where a plurality of computer terminals connected to each other, the processing program comprising:

a display controlling processing step of controlling and displaying a plurality of processing objects on said display portion in the said second computer terminal;

an operation authority managing processing step of managing and controlling setting and assignment of an operation authority individually to each of the plurality of processing objects;

an operation authority assigning processing step of assigning the operation authority to said first information terminal for each of the processing objects that the first computer terminal desires to operate;

an operation input processing step of said first computer terminal to perform operation input to the processing object based on the acquired operation authority.

11. The recording medium according to claim 10, wherein, in the terminal operation system, said second computer terminal itself comprises an input portion to perform operation input to a processing object displayed on said display portion, and in the processing program, said operation authority assigning processing step comprises a processing step of assigning the operation authority to said second computer terminal under a same condition as said first computer terminal, said operation authority managing processing step comprises a processing step of managing acquisition of the operation authority by said second computer terminal, and said operation input processing step comprises a processing step of performing operation input to the processing object based on the operation authority acquired by said second computer terminal in said operation authority assigning processing step.

12. The recording medium according to claim 10, wherein the terminal operation system comprises at least two said second computer terminals, and in the processing program, said operation authority managing processing step comprises:

a processing step of notifying each other of operation authority managing information of said second computer terminals;

a processing step, when one second computer terminal has permitted one first computer terminal to acquire the operation authority, of notifying other second computer terminals of operation authority managing information, a processing step of checking whether said one first computer terminal holds the operation authority, based on the operation authority managing information of said other second computer terminals, and a processing step of releasing the operation authority when said one first computer terminal turns out to be holding the operation authority as a result of the checking of the operation authority, so that another first computer terminal can acquire the released operation authority.

* * * * *